US008754923B2

(12) United States Patent
Chong et al.

(10) Patent No.: US 8,754,923 B2
(45) Date of Patent: Jun. 17, 2014

(54) IMAGE CAPTURE APPARATUS AND METHODS FOR PROVIDING AN IMAGE WITH EYE-TO-EYE CONTACT WITH A RECIPIENT

(75) Inventors: Kin Fui Chong, Singapore (SG); Jack Ng, Singapore (SG); Wei Lit Wilfred Leung, Singapore (SG); Seah Seang Yong, Singapore (SG); Qian Hong, Yong, Singapore (SG); Melvin Soh, Singapore (SG)

(73) Assignee: Creative Technology Ltd, Singapore (SG)

( * ) Notice: Subject to any disclaimer, the term of this patent is extended or adjusted under 35 U.S.C. 154(b) by 614 days.

(21) Appl. No.: 12/999,305

(22) PCT Filed: Jun. 17, 2009

(86) PCT No.: PCT/SG2009/000215
§ 371 (c)(1),
(2), (4) Date: Dec. 15, 2010

(87) PCT Pub. No.: WO2009/154576
PCT Pub. Date: Dec. 23, 2009

(65) Prior Publication Data
US 2011/0090300 A1    Apr. 21, 2011

(30) Foreign Application Priority Data

Jun. 18, 2008  (SG) ................................ 200804646-8

(51) Int. Cl.
*H04N 7/14*     (2006.01)
(52) U.S. Cl.
USPC ....................................................... 348/14.01
(58) Field of Classification Search
USPC ............. 348/143, 373–376, 14.01, 14.08, 77, 348/103, 343
See application file for complete search history.

(56) References Cited

U.S. PATENT DOCUMENTS

2003/0112325 A1*  6/2003  Boyden et al. ............. 348/14.16
(Continued)

FOREIGN PATENT DOCUMENTS

CN      2773743 Y       4/2006
JP      2003230049   *  8/2003
(Continued)

OTHER PUBLICATIONS

Patent/Publication Number: I284853, Application Number: 094122892, IPC :G06T-001/00(200601 ), Iventor: Wang, Kuan-Lan, Issued/Publication Aug. 1, 2007, Title: Video processing method and device for automatically locating Windows interface.*

*Primary Examiner* — Duc Nguyen
*Assistant Examiner* — Theodore Ndje
(74) *Attorney, Agent, or Firm* — Russell Swerdon; Desmund Gean (57) ABSTRACT

There is provided an image capturing apparatus able to be draped onto a stand. The apparatus includes an image capture module for capturing at least one image; and a flexible cable originating from the image capture module for connection of the image capture module to a host. The flexible cable may be for supporting the image capture module at a desired position when the image capturing apparatus is draped onto the stand. Advantageously, locating the image capture module at the desired position enables a user to look at a lens of the image capture module in a manner where a recipient of an image of the user views the user looking directly at the recipient during a video conference session. There are also provided methods for enabling a user to appear to be looking directly at a recipient of an image of the user during a video conferencing session.

15 Claims, 11 Drawing Sheets

(56) References Cited

U.S. PATENT DOCUMENTS

| | | | |
|---|---|---|---|
| 2004/0207718 A1* | 10/2004 | Boyden et al. | 348/14.01 |
| 2007/0201724 A1* | 8/2007 | Steinberg et al. | 382/103 |
| 2008/0257921 A1* | 10/2008 | Chauhan | 224/191 |
| 2008/0300055 A1* | 12/2008 | Lutnick et al. | 463/39 |
| 2009/0128647 A1* | 5/2009 | Fahn et al. | 348/221.1 |

FOREIGN PATENT DOCUMENTS

| | | | |
|---|---|---|---|
| JP | 2003230049 A | * | 8/2003 |
| TW | I284853 A | | 8/2007 |

\* cited by examiner

IMAGE CAPTURE APPARATUS AND METHODS FOR PROVIDING AN IMAGE WITH EYE-TO-EYE CONTACT WITH A RECIPIENT

FIELD OF INVENTION

The present invention relates to the field of image capturing apparatus and image transmission, particularly in relation to an image capturing apparatus and methods for providing an image which provides eye-to-eye contact with a recipient.

BACKGROUND

The ready availability and variety of free instant messaging applications for computers in the world today has led to an increase in the use of such applications for communications. As many of these applications support the use of image capturing devices like webcams, video-based communications is also increasing in popularity.

The majority of webcams currently available to the masses are either mounted onto display screens or placed on a platform during use. There are also webcams that are integrated in the display cases of monitors. The aforementioned webcams typically are able to capture images of a person positioned in front of a lens of the webcams. However, there are often issues relating to how the person in front of the lens of the webcam appears to be looking in a direction away from a recipient who is communicating with the person. This is because the eyes of the person in front of the lens of the webcam are typically looking at contents shown on a display screen, and not the lens of the webcam per se. Consequently, communications between the recipient and an initiator may seem rather unnatural, as the recipient does not visually appear to be conversing with the initiator or vice versa when either the recipient or the initiator visually appears to be looking away. This may be disadvantageous to either party as either party in the communications may be perceived to lack social etiquette in relation to maintaining eye contact when conversing to another person. This may cause unnecessary misunderstandings and adversely affect either professional or personal relationships.

In addition, an important aspect of face-to-face communications between people relates to eye contact and how eye contact enables a form of unspoken communication between people. This form of unspoken communication often aids in conveying intentions and thoughts which have not been verbalized. This is another problem in instances when there is no eye-to-eye contact during communications between the recipient and the initiator.

In this regard, even though video-based communications is readily available, many people rather avoid using it as there is no eye-to-eye type of communication using the aforementioned webcams. This is because of the difference of such a communication experience compared to having an actual face-to-face conversation in relation to a perceived lack of eye-to-eye contact.

Thus, it would be desirable if a webcam used for video-based communications is able to facilitate an eye-to-eye type of communication and more effectively replicate an actual face-to-face conversation.

SUMMARY

In a first aspect, there is provided an image capturing apparatus able to be draped onto a stand. The apparatus includes an image capture module for capturing at least one image; and a flexible cable originating from the image capture module for connection of the image capture module to a host. The flexible cable may be for supporting the image capture module at a desired position when the image capturing apparatus is draped onto the stand. Advantageously, locating the image capture module at the desired position enables a user to look at a lens of the image capture module in a manner where a recipient of an image of the user views the user looking directly at the recipient during a video conference session. The desired position may preferably be substantially aligned with a T-zone of the user's face.

Preferably, the image capture module is able to capture both moving images and audio. The stand may be either a screen (eg. a flat screen monitor or a CRT monitor) or a structure. The flexible cable may be sheathed in a flexible casing with the casing having a substantially rectangular cross-section. The flexible cable may only be partially sheathed along a first portion of the flexible cable by the flexible casing.

It is advantageous that an external surface of the flexible casing in contact with the stand has a high coefficient of friction to prevent movement of the image capture module when the image capture module is at the desired position.

The flexible cable may retractable and extendable using a spindle through use of either a biasing mechanism or manual winding, with the flexible cable being in an unobstrusive form. The location of the spindle may be dependent on a parameter such as, for example, aesthetic design, manufacturing considerations, usability, any combination of the aforementioned, and so forth.

The image capturing apparatus may also including a counter-balance weight located along a length of the flexible cable, with the weight being slidable along the length of the flexible cable to maintain the desired position of the image capture module when the image capturing apparatus is draped onto the stand. It is advantageous that the counter-balance weight acts as a spindle for coiling of the flexible cable. Coiling the flexible cable on the counter-balance weight may vary a weight of the counter-balance weight. It is also advantageous that the counter-balance weight includes a receptor to receive the image capture module to protect the lens of the image capture module. The receptor may be able to receive a lens cowl of the image capture module. The counter-balance weight may be located at a first end of the flexible casing, with a second end of the flexible casing being at the image capture module.

The image capture module may be rotatable from a first orientation to a second orientation. The image capture module may capture images in a narrow field of vision in the first orientation and in a wide field of vision in the second orientation. It is advantageous that rotating the image capture module actuates a change in a captured field of vision by the image capture module. The change in a captured field of vision may be rendered by either hardware or software.

In a second aspect, there is provided a first method for enabling a user to appear to be looking directly at a recipient of an image of the user, wherein an image capturing module is located at least a pre-determined distance above a head of an image of the recipient such that the user is able to continually look at the image of the recipient while the user's head movements are captured by the image capturing module. Preferably, the pre-determined distance above the head of the image is within a boundary of a screen. The image capturing module may be located at least a pre-determined distance above the head of the image by using a non-permanent affixing device. The non-permanent affixing device may be, for example, at least one suction cup, adhesive putty, at least one pair of Velcro strips, or double-sided adhesive strips and so forth. It is preferable that the pre-determined distance may be between one to ten centimetres. It is preferable that the user is able to position the image capturing module by viewing a preview image of the user.

In a third aspect, there is provided a second method for providing an image with a user appearing to be looking directly at a recipient of an image of the user. The method includes detecting a face of a user, tracking movements of the face of the user, capturing a series of images of the face at predetermined intervals, and centralizing the face in each image in the series of images transmitted to the recipient, with the centralization of the face in each image leading to a discarding of image data around a perimeter of each image.

Preferably, the detection of the face may be through detection of either facial features of the user or facial shapes of the user. The movements of the face may relate to changes such as, for example, a positional change of the face, a tilting of the face, a change of facing of the face and so forth. The predetermined intervals may be, for example, every second, every half second, every tenth of a second and so forth.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

The apparatus of the present invention will be described in relation to three embodiments. While the three embodiments are distinctly separate, it is understood that features from the various embodiments may be combined and may give rise to further variations of the present invention. However, it should be appreciated that the further variations of the present invention will fall within the scope of the description in the following portion.

Figure 1:
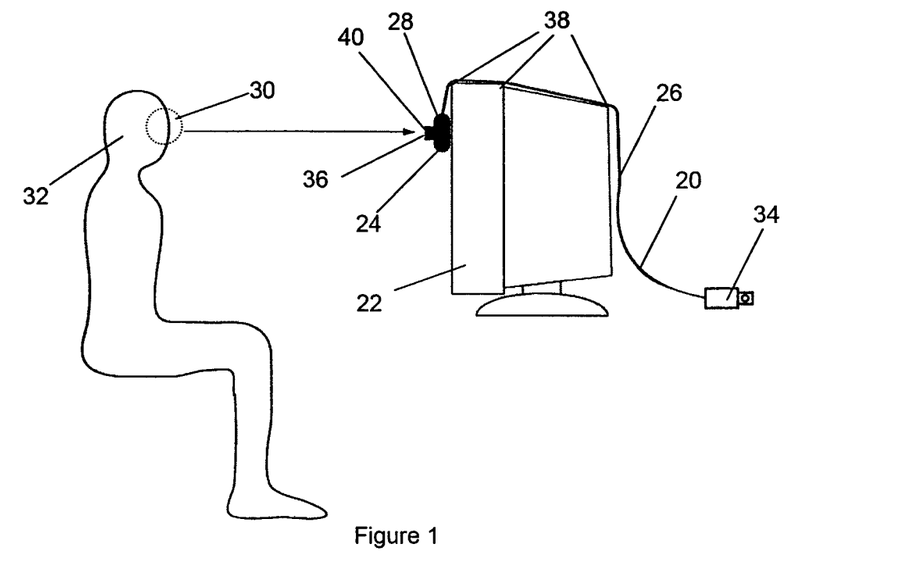
FIG. 1 shows a side view of a first embodiment of the present invention during use.
Figure 3:
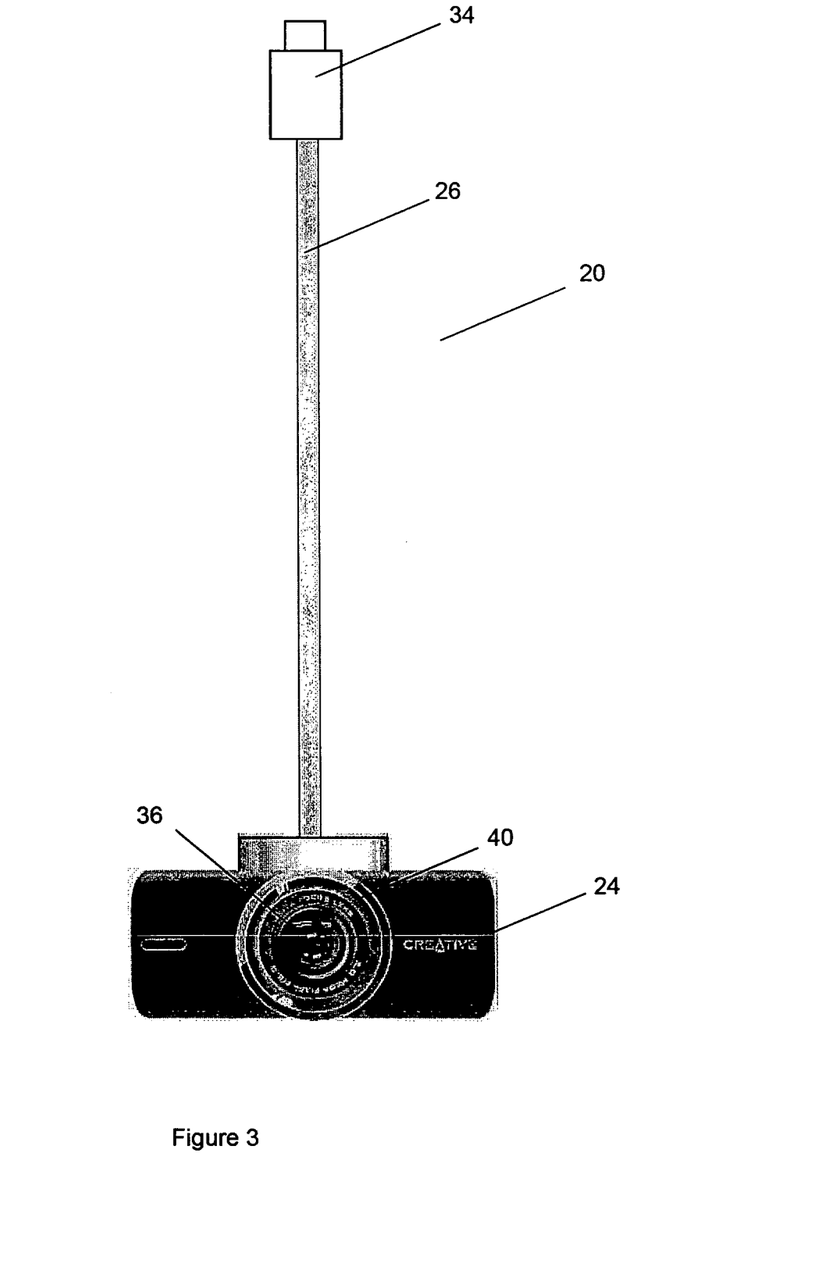
FIG. 3 shows a frontal view of the first embodiment.

FIGS. 1 and 3 both show different views of a first embodiment of the present invention. FIG. 1 shows a side view of the first embodiment during use while FIG. 3 shows a frontal view of the first embodiment. In the first embodiment, there is provided an image capturing apparatus 20 able to be draped onto a stand 22. The stand 22 may either a screen (as shown in FIG. 1) or a structure. The screen may be either a flat screen monitor or a CRT monitor (as shown in FIG. 1). The structure may be any object which is able to allow the draping of the image capturing apparatus 20.

The apparatus 20 includes an image capture module 24 for capturing at least one image. The image capture module 24 may function like a webcam, and may be able to capture both moving images and audio. The apparatus 20 also includes a flexible cable 26 originating from the image capture module 24 for connection of the image capture module 24 to a host using a connector 34. The host may be a personal computer or a notebook computer which is able to enable video communications.

The flexible cable 26 may contain a plurality of wires which allow power to be transmitted to the image capture module 24, and for the captured images and audio to be transmitted to the host. Furthermore, the flexible cable 26 may be for supporting the image capture module 24 when the image capture module 24 is located at a desired position 28 when the image capturing apparatus 20 is draped onto the stand 22. The flexible cable 26 may have a surface (either in parts or completely) with a high coefficient of friction to prevent movement of the image capture module 24 when the image capture module 24 is at the desired position 28. The high coefficient of friction of the surface of the flexible cable may prevent sliding at an area(s) of contact 38 with the stand 22. The desired position 28 may be substantially aligned with a T-zone 30 of the user's face 32.

Figure 8:
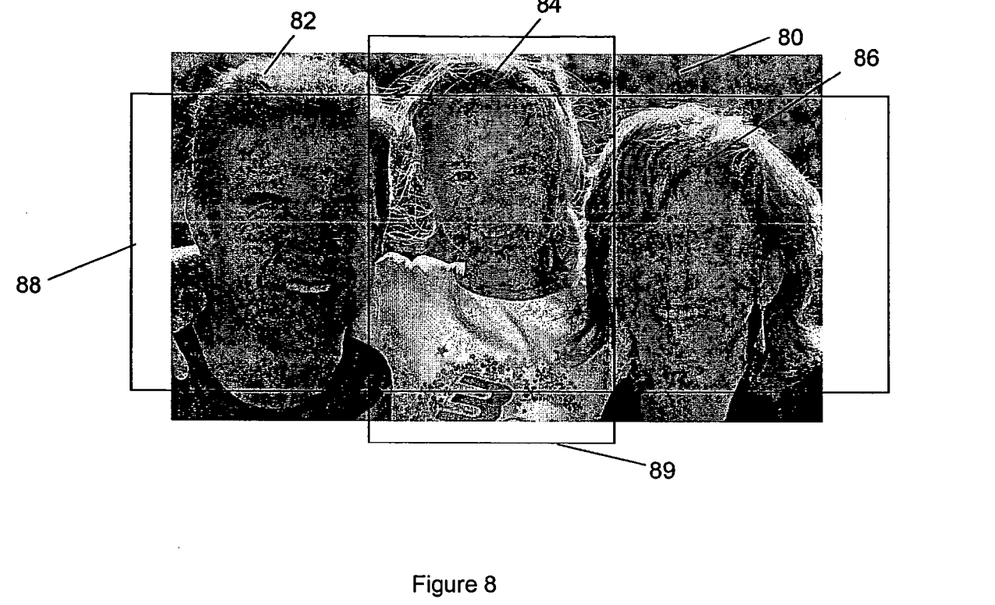
FIG. 8 shows a scene captured by an image capture module.

When the image capture module 24 is located at the desired position 28, the user 31 is able to look at a lens 36 of the image capture module 24 in a manner where a recipient of an image from the user 31 views the user 31 looking directly at the recipient during a video conference session. An example is shown in FIG. 8, where people 82, 84, 86 in a picture 80 appear to be looking directly at a reader of this specification.

The first embodiment of the image capturing apparatus 20 may further include a counter-balance weight located along a length of the flexible cable 26. The counter-balance weight is not shown in FIGS. 1 and 3 as it may be identical to the counter-balance weight which will be described in greater detail for a second embodiment of the image capturing apparatus 20. The counter-balance weight may be slidable along the length of the flexible cable 26 to maintain the desired position 28 of the image capture module 24 when the image capturing apparatus 20 is draped onto the stand 22. The slidable aspect of the counter-balance weight works on a principle of balancing moments. Besides aiding in maintaining the desired position 28 of the image capture module 24, the counter-balance weight may also act as a spindle for coiling of the flexible cable 26 for storage. Consequently, coiling the flexible cable 26 on the counter-balance weight typically varies a weight of the counter-balance weight. Thus, the counter-balance weight may aid in maintaining the desired position 28 of the image capture module 24 by varying a location of the counter-balance weight along the length of the flexible cable 26, varying a weight of the counter-balance weight, or by using both of the aforementioned variations.

Furthermore, the counter-balance weight may also include a receptor to receive the image capture module 24 to protect the lens 36 of the image capture module 24. Specifically, the receptor may receive a lens cowl 40 of the image capture module 24.

Figure 2:
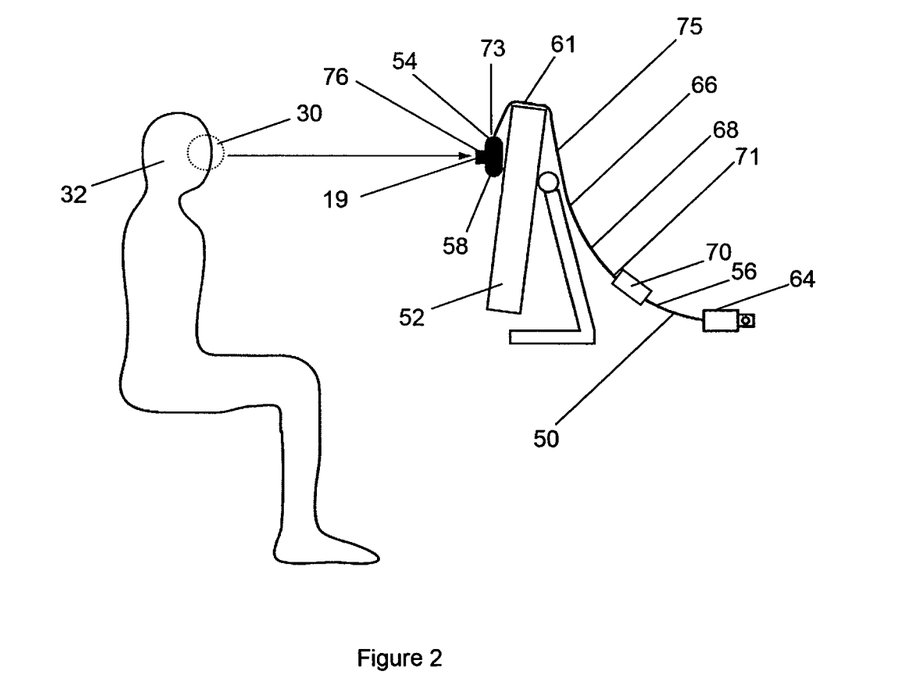
FIG. 2 shows a side view of a second embodiment of the present invention during use.
Figure 4:
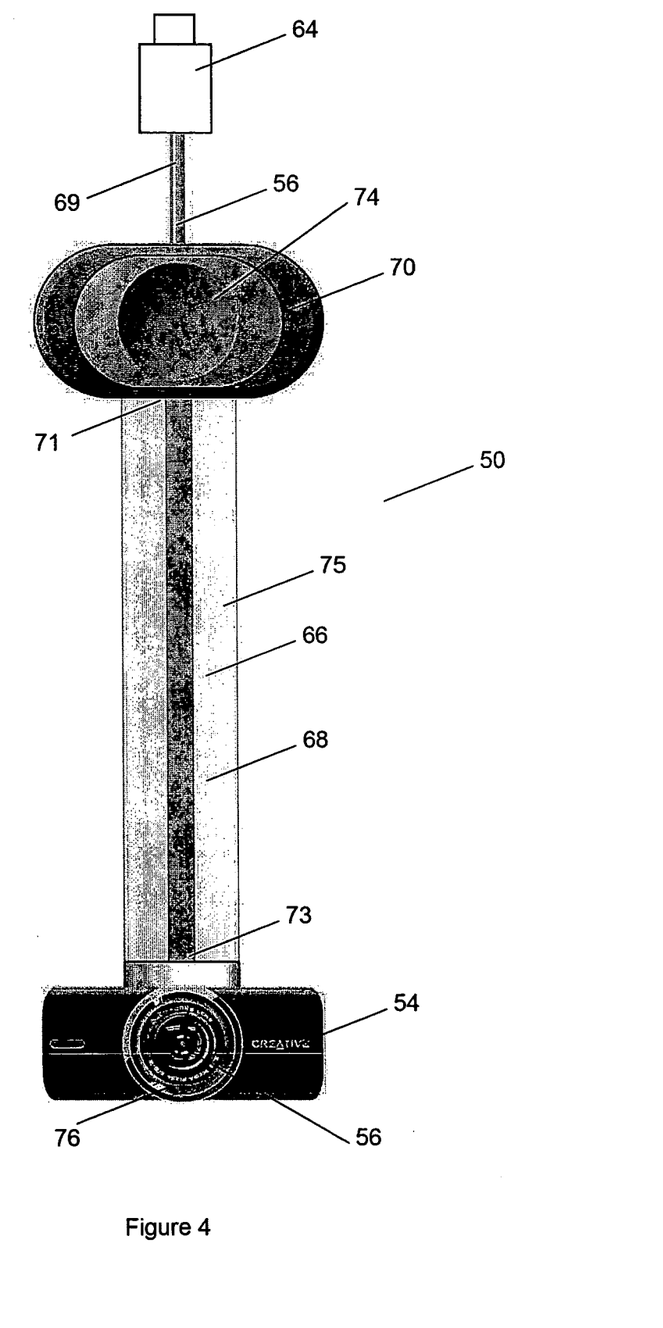
FIG. 4 shows a frontal view of the second embodiment.

FIGS. 2 and 4 both show different views of a second embodiment of the present invention. FIG. 2 shows a side view of the second embodiment during use while FIG. 4 shows a frontal view of the second embodiment. In the second embodiment, there is provided an image capturing apparatus 50 able to be draped onto a stand 52. The stand 52 may either a screen (as shown in FIG. 2) or a structure. The screen may be either a flat screen monitor (as shown in FIG. 1) or a CRT monitor. The structure may be any object which is able to allow the draping of the image capturing apparatus 50.

The apparatus 50 includes an image capture module 54 for capturing at least one image. The image capture module 54 may function like a webcam, and may be able to capture both moving images and audio. The apparatus 50 also includes a flexible cable 56 originating from the image capture module 54 for connection of the image capture module 50 to a host using a connector 64. The host may be a personal computer or a notebook computer which is able to enable video communications. The image capture module 54 of the second embodiment may be identical to the image capture module 24 of the first embodiment.

The flexible cable 56 may contain a plurality of wires which allow power to be transmitted to the image capture module 54, and for the captured images and audio to be transmitted to the host. Furthermore, the flexible cable 56 may be for supporting the image capture module 54 when the image capture module is located at a desired position 58 when the image capturing apparatus 50 is draped onto the stand 52. The desired position 58 may be substantially aligned with a T-zone 30 of the user's face 32.

When the image capture module 54 is located at the desired position 28, the user 31 is able to look at a lens 19 of the image capture module 54 in a manner where a recipient of an image from the user 31 views the user 31 looking directly at the recipient during a video conference session. An example is shown in FIG. 8, where people 82, 84, 86 in a picture 80 appear to be looking directly at a reader of this specification.

Figure 6:
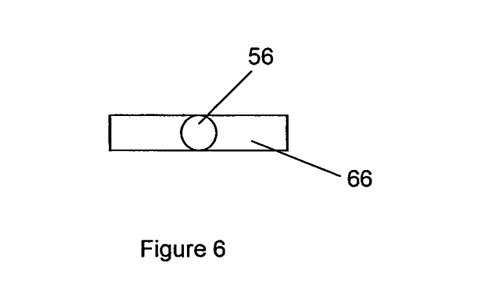
FIG. 6 shows a cross-sectional view of a flexible casing of the second embodiment.

The flexible cable 56 may be sheathed in a flexible casing 66. The casing 66 may have a substantially rectangular cross-section as shown in FIG. 6. While the flexible cable 56 is shown in FIG. 6 to be a single cable, it should be understood that flexible cable 56 may be, for example, an interwoven set of wires, a layered set of wires, a coiled set of wires, a set of flex cables (either FFC or FPC) and so forth. The flexible casing 66 may be made from, for example, stretchable fabric, silicone, latex, stretchable polymer sheets and so forth. In the second embodiment, the flexible cable may be partially sheathed along a first portion 68 of the flexible cable 56 by the flexible casing 66. An external surface 75 (either in parts or completely) of the flexible casing 66 in contact with the stand 52 may have a high coefficient of friction to prevent movement of the image capture module 54 when the image capture module 54 is at the desired position 58. The high coefficient of friction of the surface 75 of the flexible cable 56 may prevent sliding at an area(s) of contact 61 with the stand 52.

The second embodiment of the image capturing apparatus 50 may further include a counter-balance weight 70 located along a length of the flexible cable 56. The counter-balance weight 70 may be located at a first end 71 of the flexible casing 66, with a second end 73 of the flexible casing 66 being at the image capture module 54. The counter-balance weight 70 may be slidable along the length of the flexible cable 56 to maintain the desired position 58 of the image capture module 54 when the image capturing apparatus 50 is draped onto the stand 52. The slidable aspect of the counter-balance weight 70 works on a principle of balancing moments.

Besides aiding in maintaining the desired position 58 of the image capture module 54, the counter-balance weight 70 may also act as a spindle 79 (refer to FIG. 5 which shows a side view of the counter-balance weight 70) for coiling of a second portion 69 of the flexible cable 26 for storage. It should be noted that the second portion 69 is shown to be of minimal length merely for illustrative purposes. The second portion 69 may be significantly longer than the first portion 68 and vice versa. Consequently, coiling the second portion 69 of the flexible cable 26 on the counter-balance weight 70 typically varies a weight of the counter-balance weight 70. Thus, the counter-balance weight 70 may aid in maintaining the desired position 58 of the image capture module 54 by varying a location of the counter-balance weight 70 along the second portion 69 of the flexible cable 56, varying a weight of the counter-balance weight 70, or by using both of the aforementioned variations.

Figure 5:
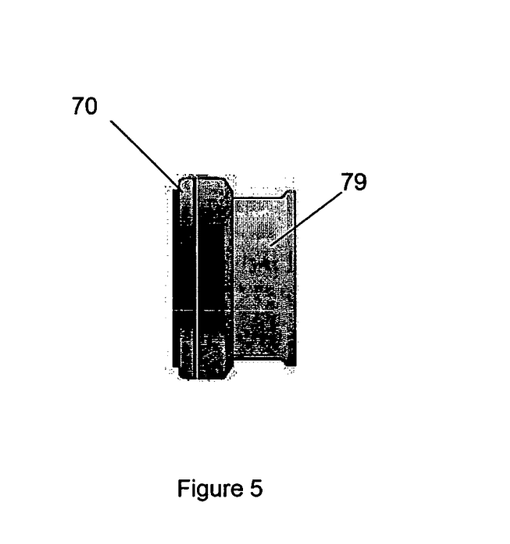
FIG. 5 shows a side view of a counter-balance weight of the second embodiment.

Furthermore, the counter-balance weight 70 may also include a receptor 74 to receive the image capture module 54 to protect the lens 19 of the image capture module 54. Specifically, the receptor 74 may receive a lens cowl 76 surrounding the lens 19 of the image capture module 24. It should be noted that while the receptor 74 is physically configured to receive the lens cowl 76 in this instance, the receptor 74 may also be physically configured to receive the image capture module 24 in its entirety.

Figure 7:
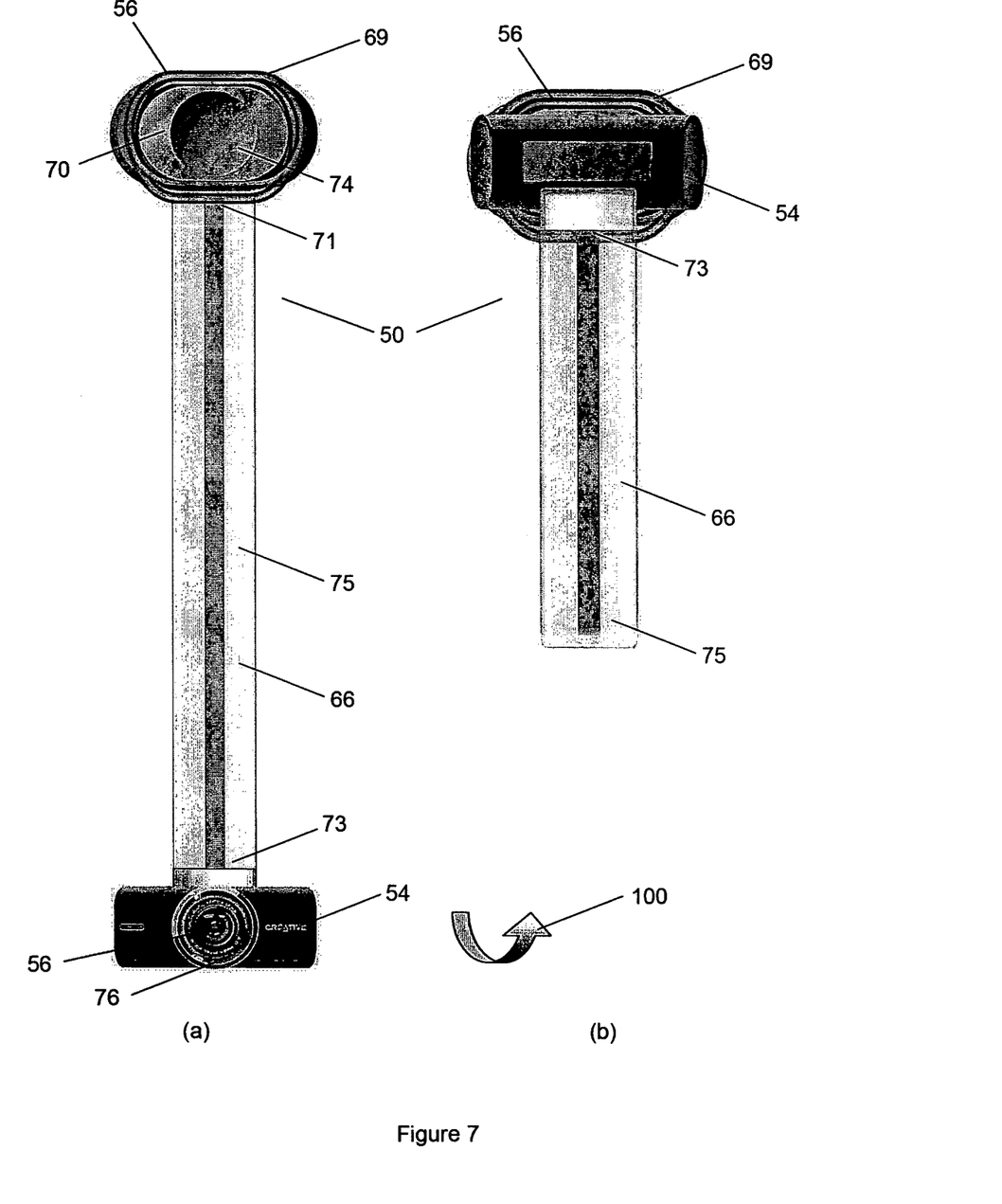
FIG. 7 shows sequential views of the second embodiment being arranged for storage.

FIG. 7 shows how the receptor 74 receives the lens cowl 76 of the image capture module 24. In FIG. 7(*a*), the image capturing apparatus 50 is shown with the second portion 69 of the flexible cable 56 already coiled around the spindle 79 of the counter-balance weight 70. With reference to a position of a reader of this specification, the image capture module 54 is lifted towards the reader and flipped as per arrow 100 such that the lens cowl 76 of the image capture module 24 is able to couple with the receptor 74 of the counter-balance weight 70 as shown in FIG. 7(*b*). When the image capturing apparatus 50 is in a form as shown in FIG. 7(*b*), it may be for storage of the image capturing apparatus 50.

Figure 12:
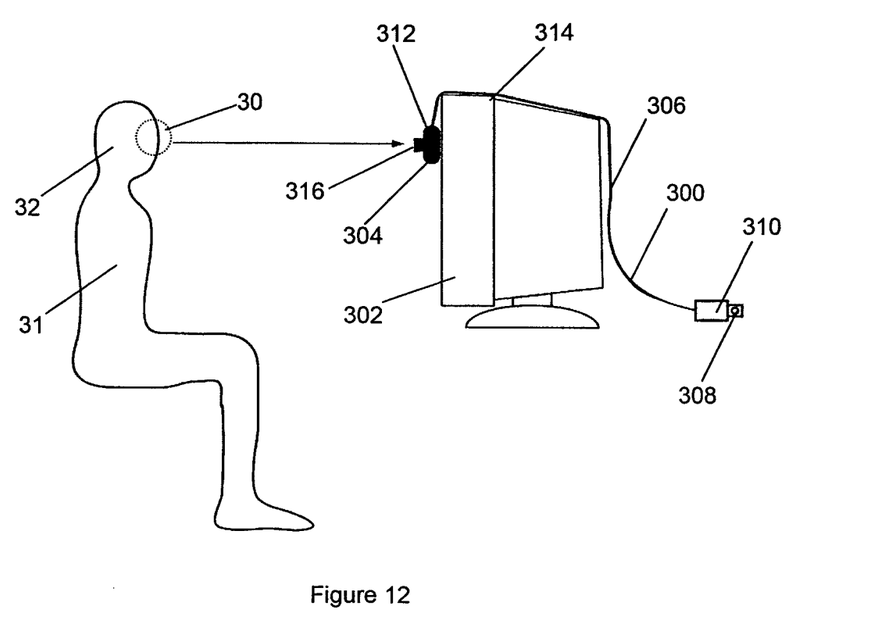
FIG. 12 shows a side view of a third embodiment of the present invention during use.
Figure 13:
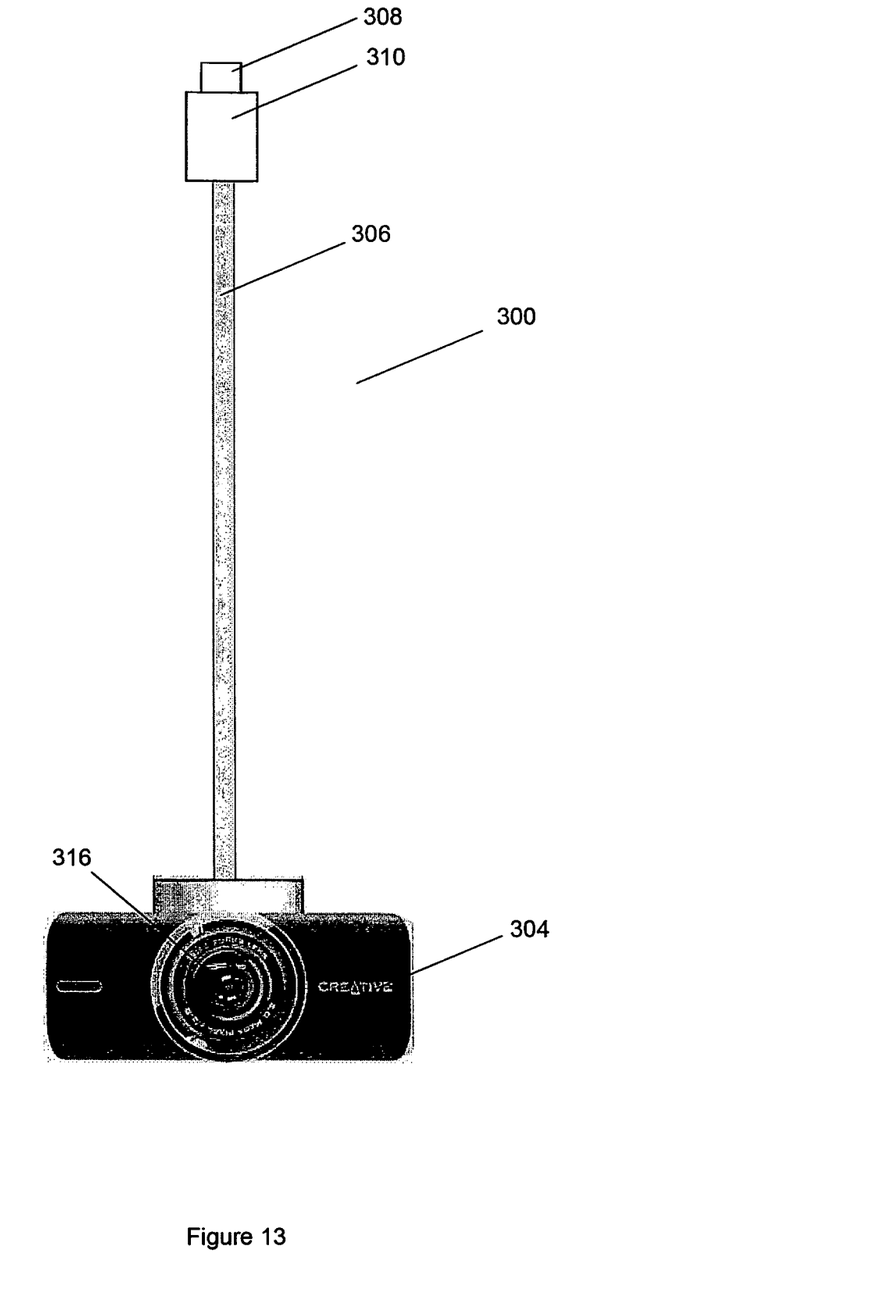
FIG. 13 shows a frontal view of the third embodiment.

FIGS. 12 and 13 both show different views of a third embodiment of the present invention. FIG. 12 shows a side view of the third embodiment during use while FIG. 13 shows a frontal view of the third embodiment. In the third embodiment, there is provided an image capturing apparatus 300 able to be draped onto a stand 302. The stand 302 may either a screen (as shown in FIG. 12) or a structure. The screen may be either a flat screen monitor or a CRT monitor (as shown in FIG. 12). The structure may be any object which is able to allow the draping of the image capturing apparatus 300.

The apparatus 300 includes an image capture module 304 for capturing at least one image. The image capture module 304 may function like a webcam, and may be able to capture both moving images and audio. The image capture module 304 may be identical to the image capture modules 24, 54 of the earlier embodiments. The apparatus 300 also includes a flexible cable 306 originating from the image capture module 304 for connection of the image capture module 304 to a host using a connector 308. The host may be a personal computer or a notebook computer which is able to enable video communications.

The flexible cable 306 may be retractable into a housing 310 of the connector 308. The retraction of the flexible cable 306 into the housing 310 may be by winding of the flexible cable 306 onto a spindle (not shown) in the housing 310 using either a biasing mechanism or manual winding. It should be appreciated that the flexible cable 306 may be retractable onto the spindle located anywhere along the flexible cable 306, where a location of the spindle may be subject to considerations such as, for example, aesthetic design, manufacturing considerations, usability, any combination of the aforementioned parameters and so forth. For example, the spindle may be located at a top edge 314 of the stand 302 for ease of extension and retraction of the flexible cable 306 by a user 31 during use of the apparatus 300, where extension and retraction of the flexible cable 306 enables a position of the image capture module 304 to be varied.

The flexible cable 306 may contain a plurality of wires which allow power to be transmitted to the image capture module 304, and for the captured images and audio to be transmitted to the host. Furthermore, the flexible cable 306 may be for supporting the image capture module 304 when the image capture module 304 is located at a desired position 312 when the image capturing apparatus 300 is draped onto the stand 302. The flexible cable 306 may have a surface (either in parts or completely) with a high coefficient of friction to prevent movement of the image capture module 304 when the image capture module 304 is at the desired position 312. The high coefficient of friction of the surface of the flexible cable 306 may prevent sliding at the top edge 314 of the stand 302. The flexible cable 306 may also be made to be as unobstrusive as possible so that the flexible cable 306 does not cause undue obstruction of the structure 302. The desired position 312 may be substantially aligned with a T-zone 30 of the user's face 32.

When the image capture module 304 is located at the desired position 312, the user 31 is able to look at a lens 316 of the image capture module 304 in a manner where a recipient of an image from the user 31 views the user 31 looking directly at the recipient during a video conference session. An example is shown in FIG. 8, where people 82, 84, 86 in a picture 80 appear to be looking directly at a reader of this specification.

Figure 15:
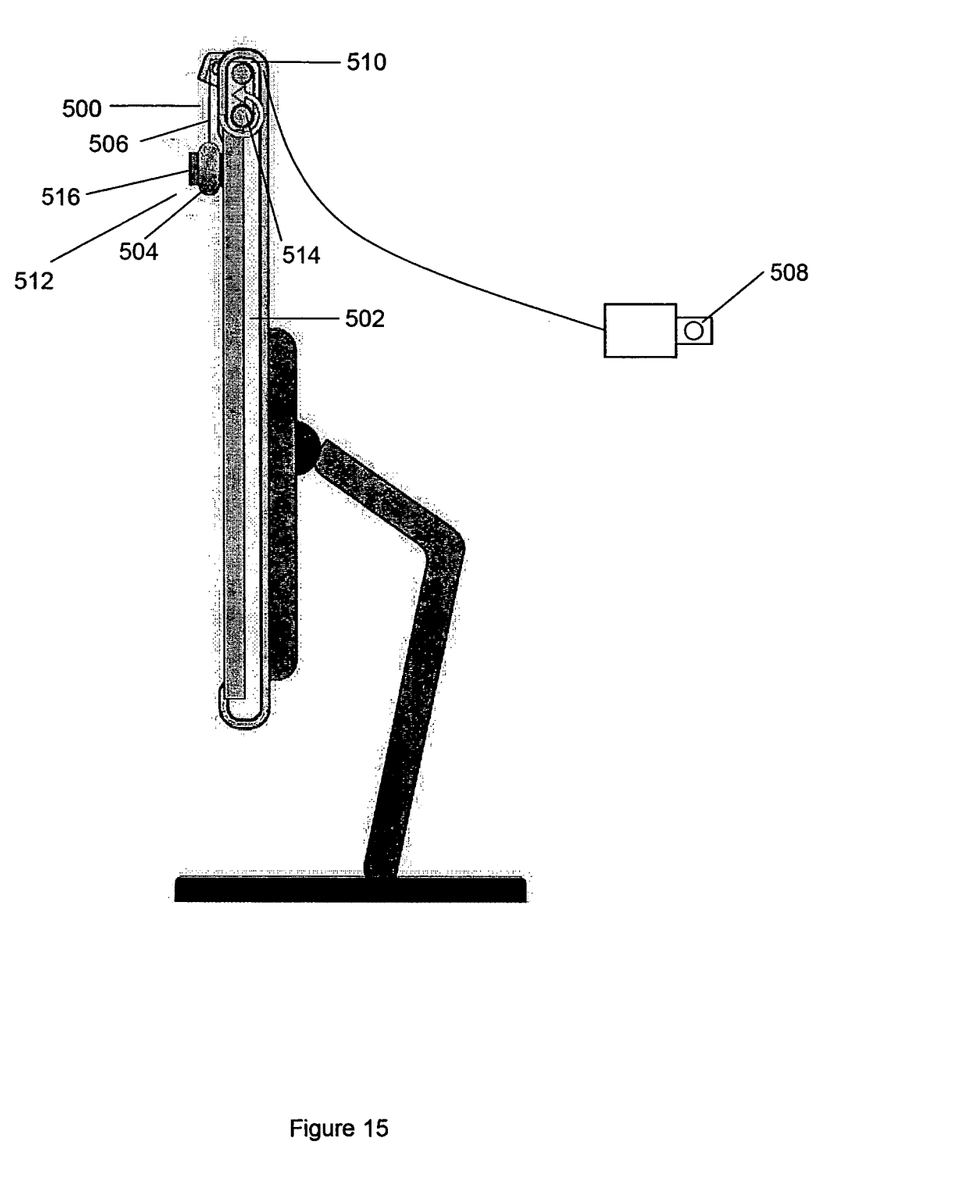
FIG. 15 shows a side view of a fourth embodiment of the present invention during use.

FIG. 15 shows a side view of the fourth embodiment during use. In the fourth embodiment, there is provided an image capturing apparatus 500 able to be draped and affixed onto a stand 502. The stand 502 may either a screen (as shown in FIG. 15) or a structure. The screen may be either a flat screen monitor (as shown in FIG. 15) or a CRT monitor. The structure may be any object which is able to allow the draping of the image capturing apparatus 500.

The apparatus 500 includes an image capture module 504 for capturing at least one image. The image capture module 504 may function like a webcam, and may be able to capture both moving images and audio. The image capture module 504 may be identical to the image capture modules 24, 54, 304 of the earlier embodiments. The apparatus 500 also includes a flexible cable 506 originating from the image capture module 504 for connection of the image capture module 504 to a host using a connector 508. The host may be a personal computer or a notebook computer which is able to enable video communications.

The flexible cable 506 may be retractable into a housing 510 of the apparatus 500. The retraction of the flexible cable 506 into the housing 510 may be by winding of the flexible cable 506 onto a spindle 514 in the housing 510 using either a biasing mechanism or manual winding (as shown in FIG. 15). It should be appreciated that a size of the spindle 514 may be subject to considerations such as, for example, aesthetic design, manufacturing considerations, usability, any combination of the aforementioned parameters and so forth.

The flexible cable 506 may contain a plurality of wires which allow power to be transmitted to the image capture module 504, and for the captured images and audio to be transmitted to the host. Furthermore, the flexible cable 506 may be for supporting the image capture module 504 when the image capture module 504 is located at a desired position 512 when the image capturing apparatus 500 is draped onto the stand 502. The flexible cable 506 may also be made to be as unobstrusive as possible so that the flexible cable 506 does not cause undue obstruction of the structure 502. The desired position 512 may be substantially aligned with a T-zone of the user's face.

When the image capture module 504 is located at the desired position 512, the user is able to look at a lens 516 of the image capture module 504 in a manner where a recipient of an image from the user views the user looking directly at the recipient during a video conference session. An example is shown in FIG. 8, where people 82, 84, 86 in a picture 80 appear to be looking directly at a reader of this specification.

Figure 9:
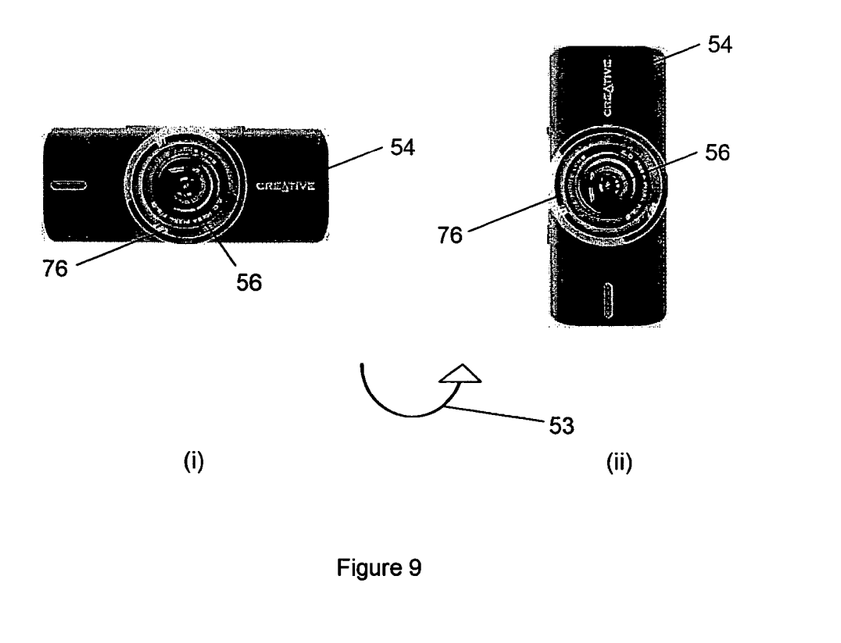
FIG. 9 shows rotation of an image capture module.

The following feature as shown in FIGS. 8 and 9 may apply to the first, second, third and fourth embodiments as described in the preceding paragraphs. However, the description is limited to the image capture module 54 of the second embodiment to avoid confusion. The image capture module 54 of the image capturing apparatus 50 may be rotatable 53 from a first orientation as shown in FIG. 9(i) to a second orientation as shown in FIG. 9(ii). The rotation 53 of the image capture module 54 shown in FIG. 9 is not limited to anti-clockwise as shown, and the rotation 53 of the image capture module 54 could also be clockwise.

The first orientation may be known as a length-wise orientation while the second orientation may be known as a breadth-wise orientation. The rotation of the image capture module 54 from the first orientation to the second orientation and vice versa may be enabled by any known rotation device/hinge/joint attached to the image capture module 54.

Rotation 53 of the image capture module 54 may vary a form of images being captured by the image capture module 54. For example, the image capture module 54 may capture images in a wide field of vision when the image capture module 54 is positioned in the first orientation as shown in FIG. 9(i). Correspondingly, the image capture module 54 may capture images in a narrow field of vision when the image capture module 54 is positioned in the second orientation as shown in FIG. 9(ii). It should be noted that the aforementioned setting may be reversed. That is, the image capture module 54 may capture images in a narrow field of vision when the image capture module 54 is positioned in the first orientation as shown in FIG. 9(i) and in a wide field of vision when the image capture module 54 is positioned in the second orientation as shown in FIG. 9(ii).

Using the picture 80 in FIG. 8 as an example, the wide field of vision is shown as bound by a length-wise border 88, while the narrow field of vision is shown as bound by a breadth-wise border 89. It is evident that the wide field of vision is preferable for the capture of images involving groups of people while the narrow field of vision is preferable for the capture of images involving a single person. Thus, being able to rotate 53 the image capture module 54 allows for the image capturing apparatus 50 to be able to capture images optimally in accordance with a number of persons in the image(s) to be captured.

Rotating 53 the image capture module 54 actuates a change in the captured field of vision by the image capture module 54. The change in the captured field of vision may be rendered by a combination of hardware and software.

Figure 10:
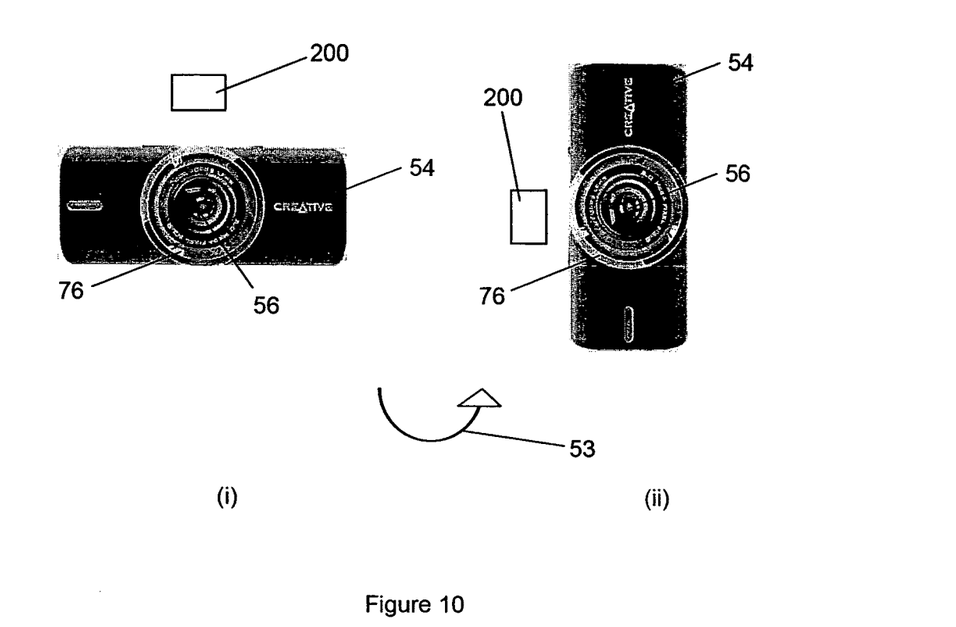
FIG. 10 shows how rotation of an image capture module affects a image capture chip of the image capture module.

For example, referring to FIG. 10, changing the captured field of vision by hardware may be in a manner where rotating the image capture module 54 causes an image capture chip 200 (shown on the outside of the image capture module 54 for illustrative purposes) in the image capture module 54 to be physically rotated 53 from a first angle to a second angle as the chip 200 may be positioned in a fixed configuration in relation to the image capture module 54. When the image capture module 54 is rotated 53, the fixed configuration of the image capture chip 200 causes an image to be captured differently, with the captured image being re-adjusted by software such that the captured image always appears to be upright and not side-ways. It should be noted that other ways of varying the captured field of vision may be employed.

Figure 11:
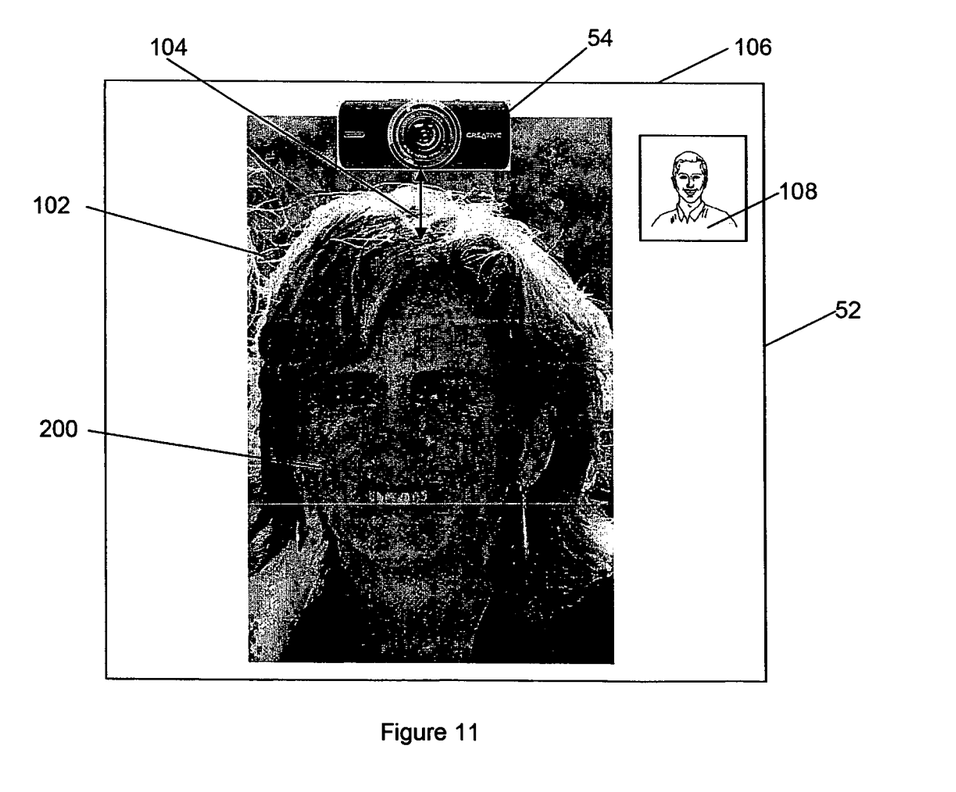
FIG. 11 shows a positioning of an image capture module for enabling transmission of eye-to-eye contact with a recipient.

In another aspect as shown in FIG. 11, there is provided a first method for providing an image with a user 31 appearing to be looking directly at a recipient of an image of the user 31 by using the image capturing apparatus 20, 50, 300 as described earlier. It should be noted that other types of image capturing apparatus may also be used. The image capturing apparatus may be used with a host like either a personal computer or a notebook computer which is able to enable video communications. In the method, it is preferable that an image capturing module (the image capturing module 54 of apparatus 50 is shown for illustration) is located at least a pre-determined distance 104 above a head 200 of an image 102 of the recipient such that the user 31 is able to continually look at the image 102 of the recipient while the user's head 32 movements are captured by the image capturing module 54.

Referring to FIG. 11, the pre-determined distance 104 above the head 200 of the image 102 may be within a boundary 106 of the screen 22, 52 of the type shown in FIGS. 1 and 2 respectively. Screen 52 shall be chosen for illustrative purposes. The pre-determined distance 104 may be between one and ten centimetres. Typically, the user 31 would be able to position the image capturing module 54 where a preview image 108 of the user 31 on the screen 22, 52 would indicate whether the user 31 is looking directly at the recipient of the image. This is because once the preview image 108 of the user 31 appears to be looking directly towards the user 31, it means that the recipient also views the user 31 as looking in a direct manner, thus, the image capturing module 54 is correctly positioned.

The preview image 108 may be located anywhere on the screen 22. Thus, the preview image 108 may act as an aid to locating the image capturing module 54. However, the image capturing module 54 may be located at the pre-determined distance 104 without a presence of the preview image 108. The image capturing module 54 may be located at least the pre-determined distance above the head of the image by using a non-permanent affixing device. The non-permanent affixing device may be, for example, at least one suction cup, adhesive putty, at least one pair of Velcro strips, and double-sided adhesive strips.

Figure 14:
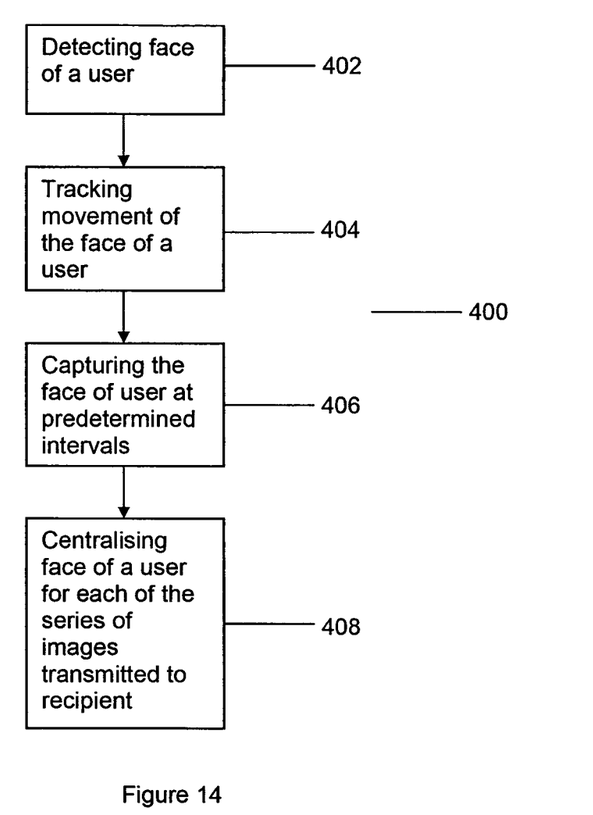
FIG. 14 shows a process flow of a second method of the present invention.

In a final aspect as shown in FIG. 14, there is shown a process flow of a second method 400 for providing an image with a user 31 appearing to be looking directly at a recipient of an image of the user 31 by using the image capturing apparatus 20, 50, 300 as described earlier. It should be noted that other types of image capturing apparatus may also be used. The image capturing apparatus may be used with a host like either a personal computer or a notebook computer which is able to enable video communications.

The second method 400 includes detecting a face 30 of a user 31 (402). The detection of the face 30 of the user 31 may be enabled using software which is commonly used with devices such as, for example, digital cameras, webcams, and so forth. The detection of the face 30 of the user 31 may be through detection of either facial features of the user 31 or facial shapes of the user 31. The method 400 also includes tracking movements of the face 30 of the user 31 (404). The movements of the face 30 may relate to, for example, a positional change of the face 30, a tilting of the face 30, a change of facing of the face 30, and so forth.

The method 400 subsequently includes capturing a series of images of the face 30 at predetermined intervals (406). The predetermined intervals may be, for example, every second, every half second, every tenth of a second, and so forth. Finally, the method 400 includes centralizing the face 30 in each image in the series of images transmitted to the recipient (408), where the centralization of the face 30 in each image may lead to a discarding of image data around a perimeter of each image. This advantageously leads to an instance of the recipient viewing the user 31 as looking in a direct manner towards the recipient.

Whilst there has been described in the foregoing description preferred embodiments of the present invention, it will be understood by those skilled in the technology concerned that many variations or modifications in details of design or construction may be made without departing from the present invention.

What is claimed is:

1. An image capturing apparatus able to be draped onto a stand having a contact surface, the apparatus comprising:
    an image capture module for capturing at least one image; and
    a flexible cable which is coupled to the image capture module and which is at least partially sheathable in a flexible casing, the image capture module being flexibly positionable relative to the stand by at least one of the flexible cable and the flexible casing with the flexible cable at least partially sheathed therein,
    wherein at least one of the flexible cable and the flexible casing comprises an external surface which resiliently contacts the contact surface of the stand to provide frictional resistance relative to the contact surface of the stand when the image capturing apparatus is draped thereonto, thereby flexibly positioning the image capture module relative to the stand and substantially impeding movement of the image capture module after the image capture module is positioned.

2. The image capturing apparatus of claim 1, wherein the image capture module is able to capture both moving images and audio.

3. The image capturing apparatus of claim 1,
    wherein the stand is either a screen or a structure; and
    wherein the screen is either a flat screen monitor or a CRT monitor.

4. The image capturing apparatus of claim 1,
    wherein the flexible casing has a substantially rectangular cross-section; and
    wherein the external surface has a high friction coefficient.

5. An image capturing apparatus able to be draped onto a stand having a contact surface, the apparatus comprising:
    an image capture module for capturing at least one image;
    a flexible cable which is coupled to the image capture module and which is at least partially sheathable in a flexible casing, the image capture module being flexibly positionable relative to the stand by at least one of the flexible cable and the flexible casing with the flexible cable at least partially sheathed therein; and
    a slidable counter-balance weight which is located along a length of one of the flexible cable and the flexible casing with the flexible cable at least partially sheathed therein, the counter-balance weight being slidable for aiding the maintenance of position of the image capture module after it is positioned, wherein at least one of the flexible cable and the flexible casing comprises an external surface which resiliently contacts the contact surface of the stand when the image capturing apparatus is draped thereonto, thereby flexibly positioning the image capture module relative to the stand and substantially impeding movement of the image capture module after the image capture module is positioned.

6. The image capturing apparatus of claim 5, wherein the counter-balance weight acts as a spindle for coiling one of the flexible cable and the flexible casing with the flexible cable at least partially sheathed therein.

7. The image capturing apparatus of claim 6, wherein coiling one of the flexible cable and the flexible casing with the flexible cable at least partially sheathed therein, on the counter-balance weight, varies a weight of the counter-balance weight.

8. The image capturing apparatus of claim 5, wherein the image capture module comprises a lens and the counter-balance weight includes a receptor to receive the image capture module to protect the lens of the image capture module.

9. The image capturing apparatus of claim 8, wherein the receptor receives a lens cowl of the image capture module.

10. The image capturing apparatus of claim 1, wherein the image capture module is rotatable from a first orientation to a second orientation.

11. The image capturing apparatus of claim 10, wherein the image capture module captures images in a narrow field of vision in the first orientation and in a wide field of vision in the second orientation.

12. The image capturing apparatus of claim 10, wherein rotating the image capture module actuates a change in a captured field of vision by the image capture module; and wherein the change in a captured field of vision is rendered by either hardware or software.

13. The image capturing apparatus of claim 1 being operable by a user having a face which comprises a T-zone, the image capturing apparatus being operated such that the image capture module is positioned to be substantially aligned with the T-zone of the user's face and the image capture module captures an image of the user.

14. The image capturing apparatus of claim 13, wherein the image of the user is receivable by a recipient such that the recipient is able to view the user looking directly at the recipient during a video conference session.

15. An image capturing apparatus able to be draped onto a stand having a contact surface, the apparatus comprising:

an image capture module for capturing at least one image; and a flexible cable which is coupled to the image capture module and which is at least partially sheathable in a flexible casing, the image capture module being flexibly positionable relative to the stand by at least one of the flexible cable and the flexible casing with the flexible cable at least partially sheathed therein, wherein at least one of the flexible cable and the flexible casing comprises an external surface which resiliently contacts the contact surface of the stand when the image capturing apparatus is draped thereonto, thereby flexibly positioning the image capture module relative to the stand and substantially impeding movement of the image capture module after the image capture module is positioned, wherein the flexible cable is retractable and extendable using a spindle through use of either a biasing mechanism or manual winding, with the flexible cable being in an unobstrusive form; and wherein the location of the spindle is dependent on a parameter selected from a group consisting of: aesthetic design, manufacturing considerations, usability and any combination of the aforementioned.

\* \* \* \* \*